(12) United States Patent
Ono et al.

(10) Patent No.: US 7,978,243 B2
(45) Date of Patent: Jul. 12, 2011

(54) IMAGING APPARATUS, DRIVING METHOD THEREOF, AND IMAGING SYSTEM

(75) Inventors: Toshiaki Ono, Ebina (JP); Tomoyuki Noda, Atsugi (JP); Hidekazu Takahashi, Zama (JP)

(73) Assignee: Canon Kabushiki Kaisha, Tokyo (JP)

( * ) Notice: Subject to any disclaimer, the term of this patent is extended or adjusted under 35 U.S.C. 154(b) by 616 days.

(21) Appl. No.: 12/032,217

(22) Filed: Feb. 15, 2008

(65) Prior Publication Data

US 2008/0204584 A1    Aug. 28, 2008

(30) Foreign Application Priority Data

Feb. 28, 2007  (JP) .................................. 2007-050223
Dec. 17, 2007  (JP) .................................. 2007-325213

(51) Int. Cl.
*H04N 3/14* (2006.01)

(52) U.S. Cl. ........ 348/302; 348/294; 348/295; 348/297; 348/307; 348/308; 348/312; 348/314

(58) Field of Classification Search ........................ None
See application file for complete search history.

(56) References Cited

U.S. PATENT DOCUMENTS

| | | | |
|---|---|---|---|
| 5,179,480 A | 1/1993 | Takahashi | 360/78.04 |
| 6,650,369 B2 | 11/2003 | Koizumi et al. | 348/301 |
| 7,116,365 B1 | 10/2006 | Ueno et al. | 348/308 |
| 7,139,028 B2 | 11/2006 | Itano et al. | 348/340 |
| 7,315,689 B2 | 1/2008 | Ono | 386/95 |
| 2004/0141076 A1 | 7/2004 | Ueno et al. | 348/301 |
| 2005/0036050 A1 | 2/2005 | Ueno et al. | 348/308 |
| 2005/0036051 A1 | 2/2005 | Ueno et al. | 348/308 |
| 2005/0041127 A1 | 2/2005 | Ueno et al. | 348/301 |
| 2005/0270393 A1 | 12/2005 | Noda et al. | 348/308 |
| 2006/0186313 A1 | 8/2006 | Yokota et al. | 250/208.1 |
| 2006/0192875 A1 | 8/2006 | Ueno et al. | 348/308 |
| 2006/0232580 A1 | 10/2006 | Koyama | 345/211 |
| 2006/0242340 A1 | 10/2006 | Ono | 710/62 |
| 2007/0097223 A1 | 5/2007 | Ono | 348/211.99 |
| 2009/0066825 A1* | 3/2009 | Nezaki et al. | 348/308 |

FOREIGN PATENT DOCUMENTS

| | | |
|---|---|---|
| JP | 11-112018 | 4/1999 |
| JP | 11-355668 | 12/1999 |
| JP | 2000-350103 | 12/2000 |
| JP | 2004-282554 | 10/2004 |
| JP | 2005-184358 | 7/2005 |
| JP | 2006-157953 | 6/2006 |
| JP | 2006-229797 | 8/2006 |
| JP | 2006-319951 | 11/2006 |

* cited by examiner

*Primary Examiner* — Jason Chan
*Assistant Examiner* — Yih-Sien Kao
(74) *Attorney, Agent, or Firm* — Fitzpatrick, Cella, Harper & Scinto

(57) ABSTRACT

In an imaging apparatus according to the present invention, the driving unit drives each of the pixels in the non-readout region in the first mode such that the setting unit sets the input unit to a third electric potential with the transfer unit being ready to transfer the electric charge to reset the photoelectric conversion unit in a first period and that the setting unit sets the input unit to a fourth electric potential for the pixel to be deselected in a second period later than the first period.

17 Claims, 10 Drawing Sheets

FIG. 1
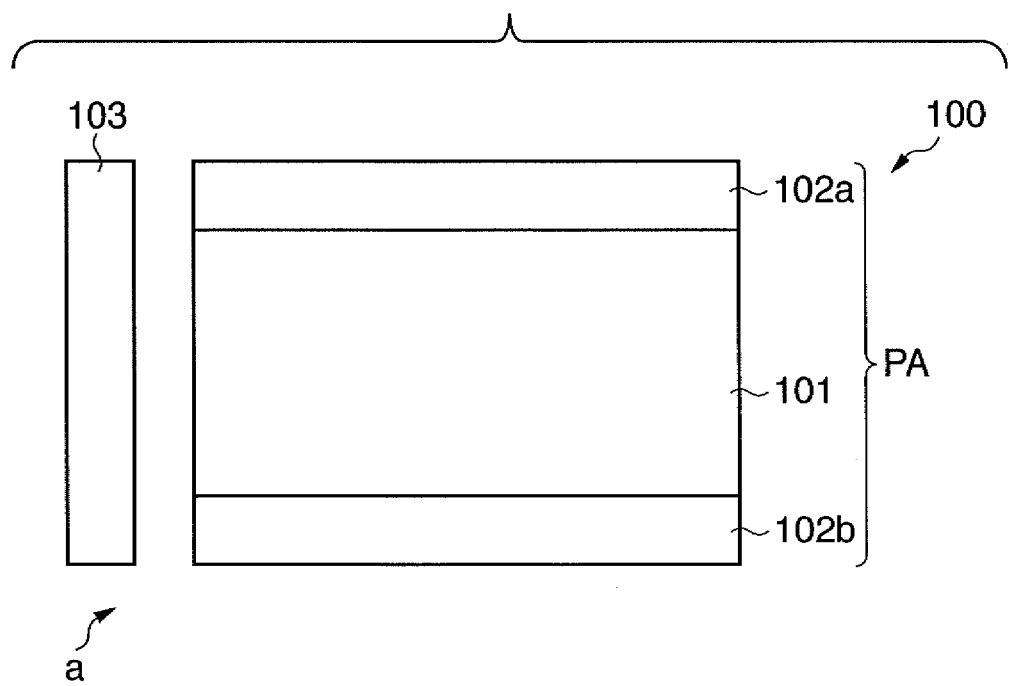
a
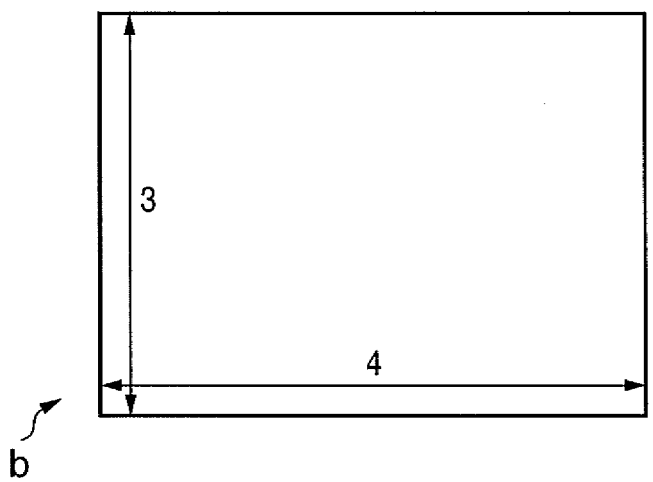
b
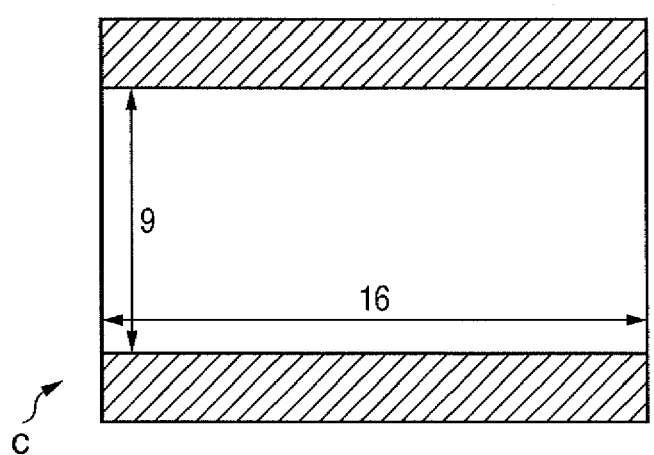
c

IMAGING APPARATUS, DRIVING METHOD THEREOF, AND IMAGING SYSTEM

BACKGROUND OF THE INVENTION

1. Field of the Invention

The present invention relates to an imaging apparatus, driving method thereof, and imaging system.

2. Description of the Related Art

Recently, with the spread of HDTV (High Definition Television), there has been a demand for an imaging apparatus which takes moving images with an aspect ratio of 16:9. On the other hand, still images are expected to be taken with an aspect ratio of 4:3 because photo paper has an aspect ratio of approximately 4:3. Thus, to implement an imaging apparatus which supports both moving and still images, it is necessary to be able to switch the aspect ratio between the 16:9 mode and the 4:3 mode. Such an imaging apparatus has an imaging area with an aspect ratio of 4:3 as a whole and reads out all pixel signals in the 4:3 mode. In the 16:9 mode, the imaging apparatus reads out signals of only pixels in the center (a readout region in which signals are read out from pixels), and does not read out signals of pixels at top and bottom (non-readout regions in which signals are not read out from pixels).

Japanese Patent Laid-Open No. 2000-350103 discloses a technique for preventing photoelectric charge from overflowing from pixels in non-readout regions into pixels in a readout region by resetting photoelectric conversion elements of the pixels in the non-readout regions. According to Japanese Patent Laid-Open No. 2000-350103, all the pixels have a vertical switching MOS.

On the other hand, to reduce pixel size, it is necessary to reduce the number of MOS transistors per pixel, by eliminating the vertical switching MOS. For that, Japanese Patent Laid-Open No. 11-112018 discloses a technique for selecting pixels by changing an operating point of an input terminal (floating diffusion: FD unit) of a signal amplification unit. That is, the FD units of selected pixels are set to an on-state electric potential and the FD units of deselected pixels are set to an off-state electric potential. This makes it possible to read out outputs of only the selected pixels to column signal lines.

When performing a 16:9 mode operation using the pixel circuit described in Japanese Patent Laid-Open No. 11-112018 and the driving method described in Japanese Patent Laid-Open No. 2000-350103, a simple combination of the two techniques does not enable proper operation. When resetting the photoelectric conversion elements of the pixels in non-readout regions in the 16:9 mode, it is necessary to preset the FD units of the pixels to an electric potential needed to reset the photoelectric conversion elements. Also, since the pixels in the non-readout regions are not selected in the 16:9 mode, the FD units of the pixels must be set to the off-state electric potential.

When, for example, amplifier transistors are N-MOSFETs, if the off-state electric potential is lower than the level needed to reset the photoelectric conversion elements, electric potential setting of the FD units of the pixels in the non-readout regions causes inconsistency in the 16:9 mode. If the FD units of the pixels are set to the electric potential needed to reset the photoelectric conversion elements, the electric potential of the FD units is inevitably set higher than the off-state electric potential. This causes amplifier transistors in the non-readout regions to turn on, causing the pixel signals to be read out from the non-readout regions to the column signal lines.

Conversely, if the FD units of the pixels in the non-readout regions are set to the off-state electric potential in the 16:9 mode, the electric potential of the FD units is inevitably set lower than the level needed to reset the photoelectric conversion elements. This makes it impossible to reset the photoelectric conversion elements of the pixels in the non-readout regions. This in turn may cause photoelectric charge to leak from the pixels in the non-readout regions into the pixels in the readout region.

SUMMARY OF THE INVENTION

The present invention provides for reducing photoelectric charge leaking from pixels in non-readout regions of an imaging apparatus which uses electric potentials of input units of amplification units to select and deselect pixels.

According to a first aspect of the present invention, there is provided an imaging apparatus comprising: a pixel array in which a plurality of pixels are arranged in a row direction and in a column direction, each of the pixels including a photoelectric conversion unit, an amplification unit which amplifies a signal based on electric charge generated in the photoelectric conversion unit, an input unit of the amplification unit, a transfer unit which transfers the electric charge accumulated in the photoelectric conversion unit to the input unit, and a setting unit which sets the input unit to a first electric potential for the pixel to be selected or sets the input unit to a second electric potential for the pixel to be deselected; and a driving unit which drives the plurality of pixels in the pixel array, wherein, in a first mode, the pixel array includes a readout region in which signals are read out from the pixels and a non-readout region in which no signal is read out from the pixels, and the driving unit drives each of the pixels in the non-readout region in the first mode such that the setting unit sets the input unit to a third electric potential with the transfer unit being ready to transfer the electric charge to reset the photoelectric conversion unit in a first period and that the setting unit sets the input unit to a fourth electric potential for the pixel to be deselected in a second period later than the first period.

According to a second aspect of the present invention, there is provided an imaging apparatus comprising: a pixel array in which a plurality of pixels are arranged in a row direction and in a column direction, each of the pixels including a photoelectric conversion unit, an amplification unit which amplifies a signal based on electric charge generated in the photoelectric conversion unit, an input unit of the amplification unit, a transfer unit which transfers the electric charge accumulated in the photoelectric conversion unit to the input unit, and a setting unit which sets the input unit to a first electric potential for the pixel to be selected or sets the input unit to a second electric potential for the pixel to be deselected; and a driving unit which drives the plurality of pixels in the pixel array, wherein the pixel array includes, in a first mode, a readout region in which signals are read out from the pixels and a non-readout region in which no signal is read out from the pixels, and the driving unit drives pixels in the portion of the non-readout region which is adjacent to the readout region in the first mode such that the setting unit sets the input unit to a third electric potential with the transfer unit being ready to transfer the electric charge to resets the photoelectric conversion unit in a first period and that the setting unit sets the input unit to a fourth electric potential for the pixel to be deselected in a second period later than the first period.

According to a third aspect of the present invention, there is provided a driving method for an imaging apparatus which comprises a pixel array in which a plurality of pixels are arranged in a row direction and in a column direction, each of the pixels including a photoelectric conversion unit, an amplification unit which amplifies a signal based on electric charge generated in the photoelectric conversion unit, an input unit of the amplification unit, a transfer unit which transfers the electric charge accumulated in the photoelectric conversion unit to the input unit, and a setting unit which sets the input unit to a first electric potential for the pixel to be selected or sets the input unit to a second electric potential for the pixel to be deselected, wherein, in a first mode, the pixel array includes a readout region in which signals are read out from the pixels and a non-readout region in which no signal is read out from the pixels, the driving method comprising: a setting step of driving each of the pixels in the non-readout region in the first mode such that the setting unit sets the input unit to a third electric potential with the transfer unit being ready to transfer the electric charge in a first period; and a deselection step of driving each of the pixels in the non-readout region in the first mode such that the setting unit sets the input unit to a fourth electric potential for the pixel to be deselected in a second period later than the first period.

According to a fourth aspect of the present invention, there is provided a driving method for an imaging apparatus which comprises a pixel array in which a plurality of pixels are arranged in a row direction and in a column direction, each of the pixels including a photoelectric conversion unit, an amplification unit which amplifies a signal based on electric charge generated in the photoelectric conversion unit, an input unit of the amplification unit, a transfer unit which transfers the electric charge accumulated in the photoelectric conversion unit to the input unit, and a setting unit which sets the input unit to a first electric potential for the pixel to be selected or sets the input unit to a second electric potential for the pixel to be deselected, wherein, in a first mode, the pixel array includes a readout region in which signals are read out from the pixels and a non-readout region in which no signal is read out from the pixels, the driving method comprising: a setting step of driving pixels in the portion of the non-readout region which is adjacent to the readout region in the first mode such that the setting unit sets the input unit to a third electric potential with the transfer unit being ready to transfer the electric charge in a first period, and a deselection step of driving each of the pixels in the non-readout region in the first mode such that the setting unit sets the input unit to a fourth electric potential for the pixel to be deselected in a second period later than the first period.

According to a fifth aspect of the present invention, there is provided an imaging system comprising: the imaging apparatus according to the first aspect of the present invention; an optical system which focuses light onto the pixel array of the imaging apparatus; and a signal processing unit which processes an output signal from the imaging apparatus and thereby generates image data.

The present invention makes it possible to reduce photoelectric charge leaking from pixels in a non-readout region of an imaging device which uses electric potentials of an input unit of an amplification unit to select and deselect pixels.

Further features of the present invention will become apparent from the following description of exemplary embodiments with reference to the attached drawings.

BRIEF DESCRIPTION OF THE DRAWINGS

FIG. 1 is a diagram of an imaging apparatus according to a first embodiment of the present invention;

DESCRIPTION OF THE EMBODIMENTS

An imaging apparatus 100 according to a first embodiment of the present invention will be described with reference to FIG. 1. FIG. 1 is a diagram of the imaging apparatus 100 according to the first embodiment of the present invention.

As shown in a of FIG. 1, the imaging apparatus 100 has a pixel array PA and driving unit 103.

In a first mode, the pixel array PA has a readout region 101 and non-readout regions 102*a* and 102*b*. Signals are read out from pixels in the readout region 101 in the first mode. No signal is read out from pixels in the non-readout regions 102*a* and 102*b* in the first mode. Consequently, images obtained in the first mode have an aspect ratio of 16:9 as shown in c of FIG. 1. The readout region 101 includes selected pixels which are pixels in rows selected to be read out and non-selected pixels which are pixels in the other rows.

In a second mode, signals are read out from all the pixels in the pixel array PA. Consequently, images obtained in the second mode have an aspect ratio of 4:3 as shown in b of FIG. 1. The pixels include selected pixels which are pixels in rows selected to be read out and non-selected pixels which are pixels in the other rows.

The driving unit 103 is laid out on the periphery of the pixel array PA. The driving unit 103 drives multiple pixels in the pixel array PA. The driving unit 103 includes, for example, a vertical shift register which scans the pixel array PA in a vertical direction.

Incidentally, some components are omitted in FIG. 1, including a readout circuit which reads out signals output to column signal lines 71, 72, etc. (see FIG. 2) and a horizontal shift register which scans the readout circuit in a horizontal direction.

Figure 2:
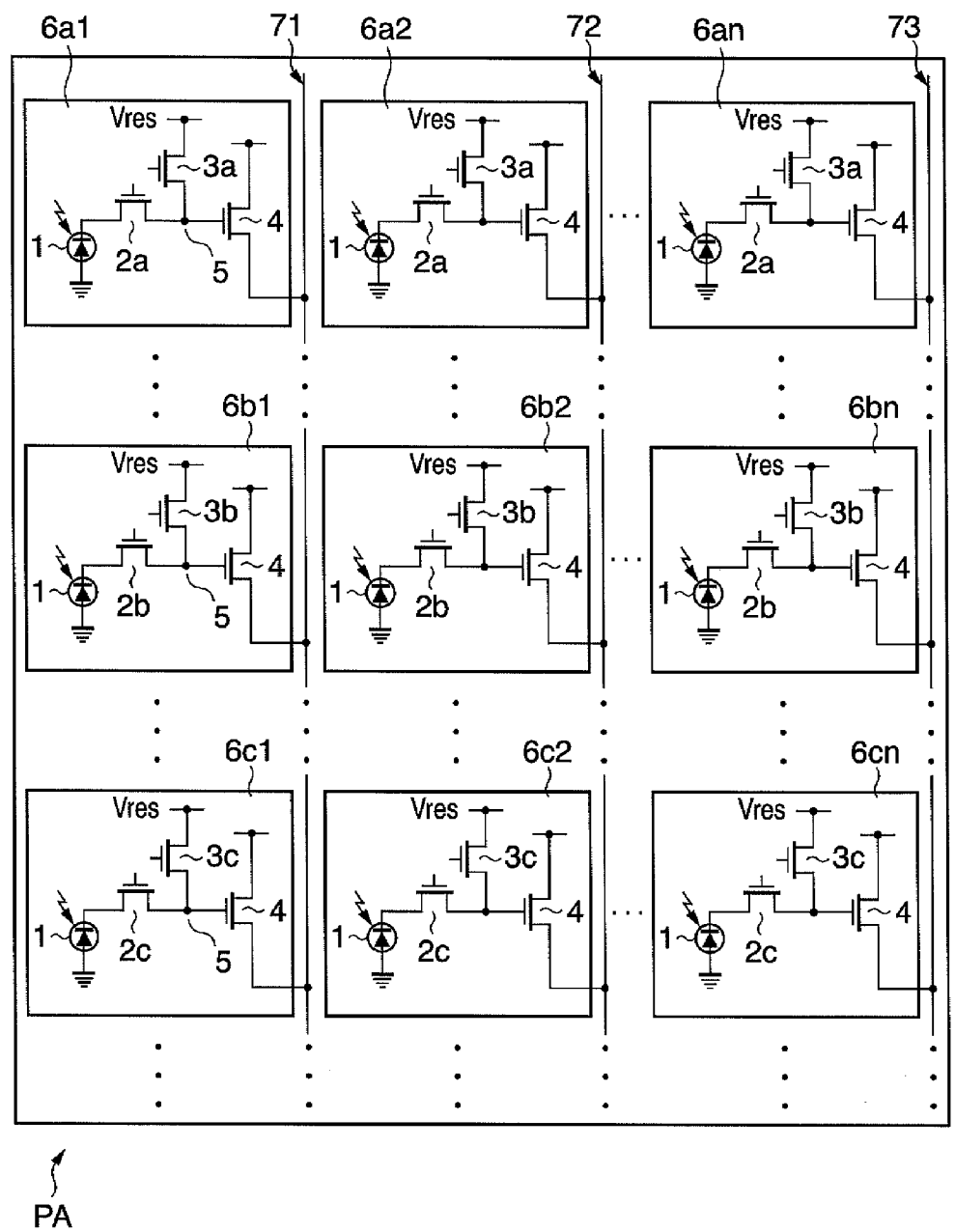
FIG. 2 is a diagram showing a configuration of a pixel array in the imaging apparatus.

Next, the pixel array PA in the imaging apparatus 100 will be described with reference to FIG. 2. FIG. 2 is a diagram showing a configuration of the pixel array PA in the imaging apparatus 100.

In the pixel array PA, multiple pixels (6*a*1, 6*a*2, . . . , 6*an*, . . . , 6*cn*, . . . ) are arranged in a row direction and column direction as shown in FIG. 2.

The pixel 6*a*1 has a photoelectric conversion unit 1, input unit 5, transfer unit 2*a*, setting unit 3*a*, and amplification unit 4. The pixel is a minimum unit which includes one photoelectric conversion unit and a set of elements used to read out a signal from the photoelectric conversion unit via a column signal line to an output signal line. Although adjacent photoelectric conversion units can share elements, even in that case, the pixel is defined as a minimum unit used to read out a signal from one photoelectric conversion unit.

The photoelectric conversion unit 1 generates and accumulates electric charge according to incident light. The photoelectric conversion unit 1 is, for example, a photodiode of a type which accumulates negative electric charge (electrons).

The input unit 5 is an input unit of the amplification unit 4 (described later) and holds the electric charge accumulated by the photoelectric conversion unit 1 and transferred from the photoelectric conversion unit 1. The input unit 5 is, for example, a floating diffusion unit.

The transfer unit 2a transfers the electric charge accumulated in the photoelectric conversion unit 1 to the input unit 5 with a predetermined timing. The transfer unit 2a is, for example, a MOS transistor for transfer.

The setting unit 3a sets the input unit 5 to a first electric potential (see V1 in FIG. 4) for the pixel to be selected and sets the input unit 5 to a second electric potential (see V2 in FIG. 4) for the pixel to be deselected. The setting unit 3a is, for example, a MOS transistor for resetting. The first electric potential, at which the amplification unit 4 turns on, must be higher than an electric potential needed to reset the photoelectric conversion unit 1. The second electric potential, at which the amplification unit 4 turns off, must be lower than an electric potential which is an electric potential of the column signal line (e.g. column signal line 71) plus a threshold voltage at which the amplification unit 4 (NMOS transistor for amplification) turns on.

The amplification unit 4 amplifies a signal (voltage) resulting from the electric charge held by the input unit 5. The amplification unit 4 is, for example, a NMOS transistor for amplification.

The other pixels such as 6a2 are configured in the same manner as the pixel 6a1.

Figure 3:
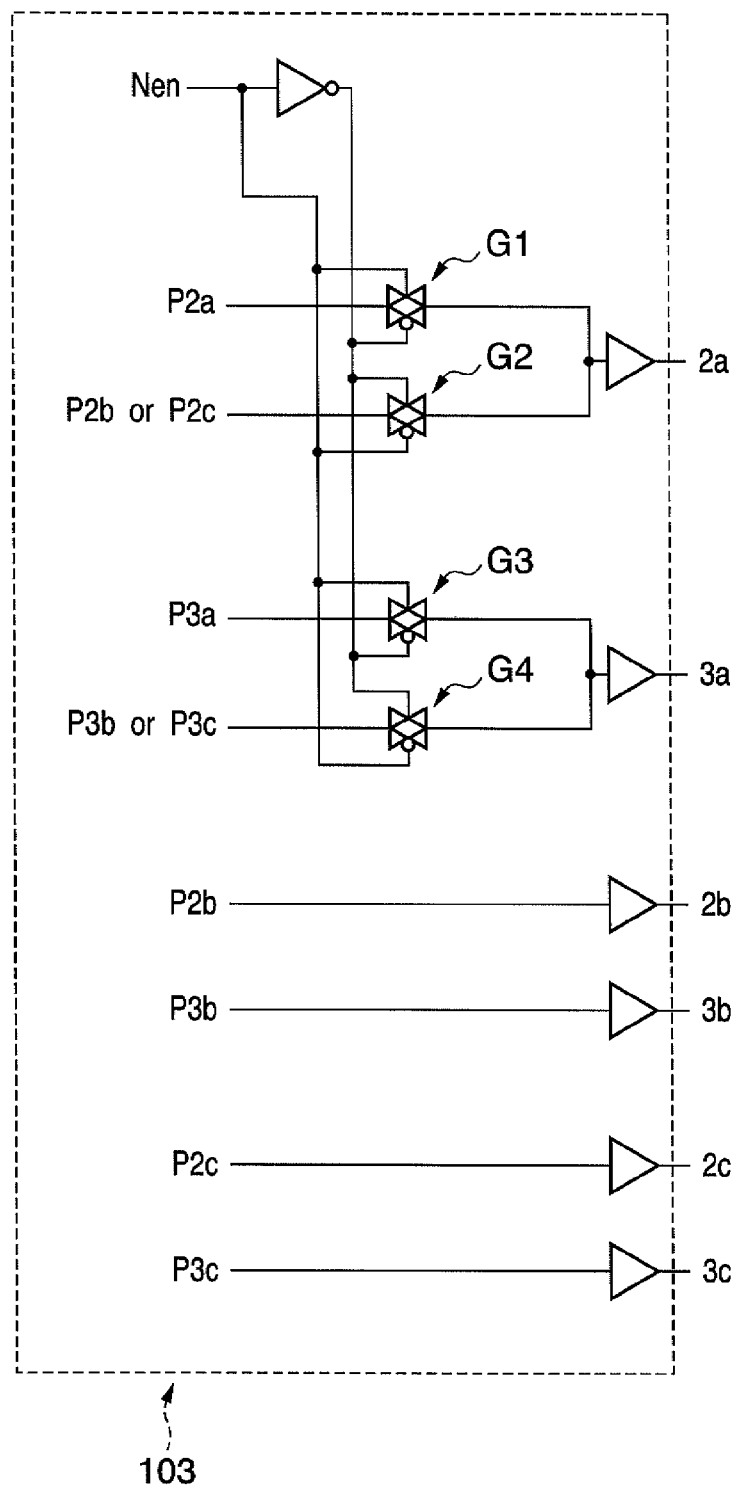
FIG. 3 is a diagram showing part of a circuit configuration in a driving unit.
Figure 4:
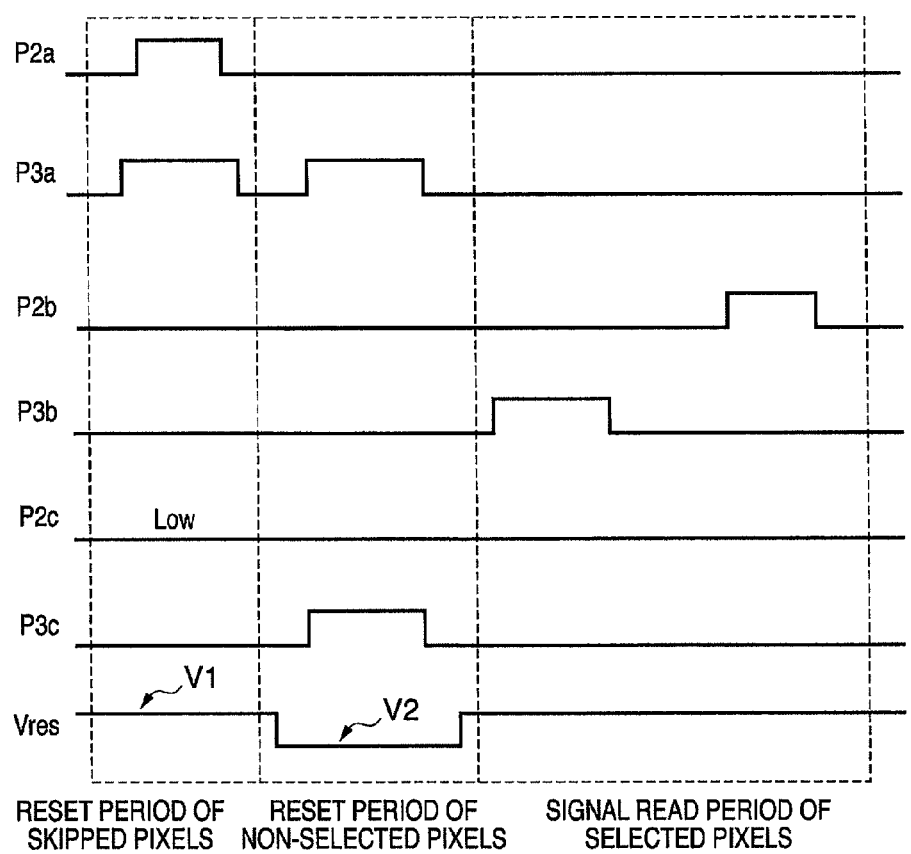
FIG. 4 is a waveform chart of pulses supplied by the driving unit to pixels.

Next, the driving unit 103 of the imaging apparatus 100 will be described with reference to FIGS. 3 and 4. FIG. 3 is a diagram showing part of a circuit configuration in the driving unit 103. FIG. 4 is a waveform chart of pulses supplied by the driving unit 103 to pixels.

First, description will be given of a case in which the first mode is selected.

At this time, a High signal is input in a mode control terminal Nen shown in FIG. 3, indicating that the first mode has been selected. Consequently, transfer gates G1 and G3 are opened while transfer gates G2 and G4 are closed. The driving unit 103 supplies pulses P2a (see FIG. 4) to the transfer units 2a of the pixels in the non-readout regions 102a and 102b, and pulses P3a (see FIG. 4) to the setting units 3a of the pixels in the non-readout regions 102a and 102b. Besides, the driving unit 103 supplies pulses P2b (see FIG. 4) to the transfer units 2b of the selected pixels in the readout region 101, and pulses P3b (see FIG. 4) to the setting units 3b of the selected pixels in the readout region 101. Also, the driving unit 103 supplies pulses P2c (see FIG. 4) to the transfer units 2c of the non-selected pixels in the readout region 101, and pulses P3c (see FIG. 4) to the setting units 3c of the non-selected pixels in the readout region 101.

That is, in the first mode, the driving unit 103 drives each of the pixels in the non-readout regions 102a and 102b such that the setting unit 3a sets the input unit 5 to a third electric potential with the transfer unit 2a being ready to transfer electric charge in a first period. This step is referred to as a setting step. The third electric potential, at which the amplification unit 4 turns on, may be equal to the first electric potential. It is, for example, electric potential V1 of a reset voltage signal Vres shown in FIG. 4. The first period is, for example, a "reset period of skipped pixels" shown in FIG. 4. Consequently, in each of the pixels in the non-readout regions 102a and 102b, both the transfer unit 2a and setting unit 3a turn on in the first period to reset the photoelectric conversion unit 1 and input unit 5.

Also, the driving unit 103 drives each of the selected pixels in the readout region 101 such that the transfer unit 2b and setting unit 3b turn off in the first period. Besides, the driving unit 103 drives each of the non-selected pixels in the readout region 101 such that the transfer unit 2c and setting unit 3c turn off in the first period.

Next, the driving unit 103 drives each of the pixels in the non-readout regions 102a and 102b such that the setting unit 3a sets the input unit to a fourth electric potential for the pixel to be deselected in a second period later than the first period. This step is referred to as a deselection step. The fourth electric potential, at which the amplification unit 4 turns off, may be equal to the second electric potential. It is, for example, electric potential V2 of the reset voltage signal Vres shown in FIG. 4. The second period is, for example, a "reset period of non-selected pixels" shown in FIG. 4. Consequently, in each of the pixels in the non-readout regions 102a and 102b, the transfer unit 2a turns off and the setting unit 3a turns on in the second period. Thus, in each of the pixels in the non-readout regions 102a and 102b, the setting unit 3a sets the input unit 5 to the fourth electric potential for the pixel to be deselected. In the state where the pixel is deselected, the amplification unit 4 of the pixel remains off.

Besides, the driving unit 103 drives each of the selected pixels in the readout region 101 such that the transfer unit 2b and setting unit 3b turn off in the second period. Also, the driving unit 103 drives each of the non-selected pixels in the readout region 101 such that the transfer unit 2c turns off and the setting unit 3c turns on in the second period. Consequently, in each of the non-selected pixels in the readout region 101, the setting unit 3c sets the input unit 5 to the second electric potential (e.g., V2 in FIG. 4) for the non-selected pixel to be deselected.

Next, the driving unit 103 drives each of the selected pixels in the readout region 101 such that the transfer unit 2b turns off and the setting unit 3b turns on in a third period later than the second period. The third period is, for example, a "signal readout period of selected pixels" shown in FIG. 4. Consequently, in the selected pixel in the readout region 101, the setting unit 3b sets the input unit 5 to the first electric potential (e.g., V1 in FIG. 4) for the selected pixel to be selected. Subsequently, the driving unit 103 drives each of the selected pixels in the readout region 101 such that the transfer unit 2b turns on and the setting unit 3b turns off in the third period later than the second period. Consequently, in the selected pixel in the readout region 101, the electric charge accumulated in the photoelectric conversion unit 1 is transferred to the input unit 5 and a signal (voltage) resulting from the electric charge held in the input unit 5 is amplified and read out via the column signal line (e.g. column signal lines 71) to an output signal line. On the other hand, the driving unit 103 drives each of the pixels in the non-readout regions 102a and 102b such that the transfer unit 2a and setting unit 3a turn off in the third period. The driving unit 103 drives each of the non-selected pixels in the readout region 101 such that the transfer unit 2c and setting unit 3c turn off in the third period.

Next, description will be given of a case in which the second mode is selected, focusing on differences from the first mode.

At this time, a Low signal is input in the mode control terminal Nen shown in FIG. 3, indicating that the second mode has been selected. Consequently, the transfer gates G2 and G4 are opened while the transfer gates G1 and G3 are closed. As a result, the driving unit 103 supplies pulses P2b (see FIG. 4) to the transfer units 2a of the selected pixels, and pulses P3b (see FIG. 4) to the setting units 3a of the selected pixels. Alternatively, the driving unit 103 supplies pulses P2c (see FIG. 4) to the transfer units 2a of the non-selected pixels, and pulses P3c (see FIG. 4) to the setting units 3a of the non-selected pixels.

That is, in the second mode, the driving unit 103 drives each of the selected pixels such that the transfer unit 2a and setting unit 3a turn off in the first period. Alternatively, the driving unit 103 drives each of the non-selected pixels such that the transfer unit 2a and setting unit 3a turn off.

Next, the driving unit 103 drives each of the selected pixels such that the transfer unit 2a and setting unit 3a turn off in the second period. On the other hand, the driving unit 103 drives each of the non-selected pixels such that the transfer unit 2c turns off and the setting unit 3c turns on in the second period. Consequently, in each of the non-selected pixels, the setting unit 3c sets the input unit 5 to the second electric potential (e.g., V2 in FIG. 4) for the non-selected pixel to be deselected.

Next, the driving unit 103 drives each of the selected pixels such that the transfer unit 2a turns off and the setting unit 3a turns on in the third period later than the second period. Consequently, in each of the selected pixels, the setting unit 3a sets the input unit 5 to the first electric potential (e.g., V1 in FIG. 4) for the selected pixel to be selected. Subsequently, the driving unit 103 drives each of the selected pixels such that the transfer unit 2a turns on and the setting unit 3a turns off in the third period later than the second period. Consequently, in each of the selected pixels, the electric charge accumulated in the photoelectric conversion unit 1 is transferred to the input unit 5 and a signal (voltage) resulting from the electric charge held in the input unit 5 is amplified and read out via the column signal line (e.g. column signal lines 71) to an output signal line. Alternatively, the driving unit 103 drives each of the non-selected pixels such that the transfer unit 2a and setting unit 3a turn off in the third period.

Incidentally, the photoelectric conversion unit may be a photodiode of a type which accumulates positive holes. Also, the amplifier transistor may be a P-MOSFET. In that case, however, since PMOS is opposite in polarity to NMOS, high-low relationship in the electric potential according to this embodiment is reversed as well.

As described above, the first embodiment of the present invention can properly reset the photoelectric conversion units 1 of the pixels in the non-readout regions and set the input units 5 to the off-state electric potential (second electric potential) at the same time. This makes it possible to reduce photoelectric charge leaking from pixels in non-readout regions of an imaging apparatus which uses electric potentials of input units of amplification units to select and deselect pixels.

Figure 5:
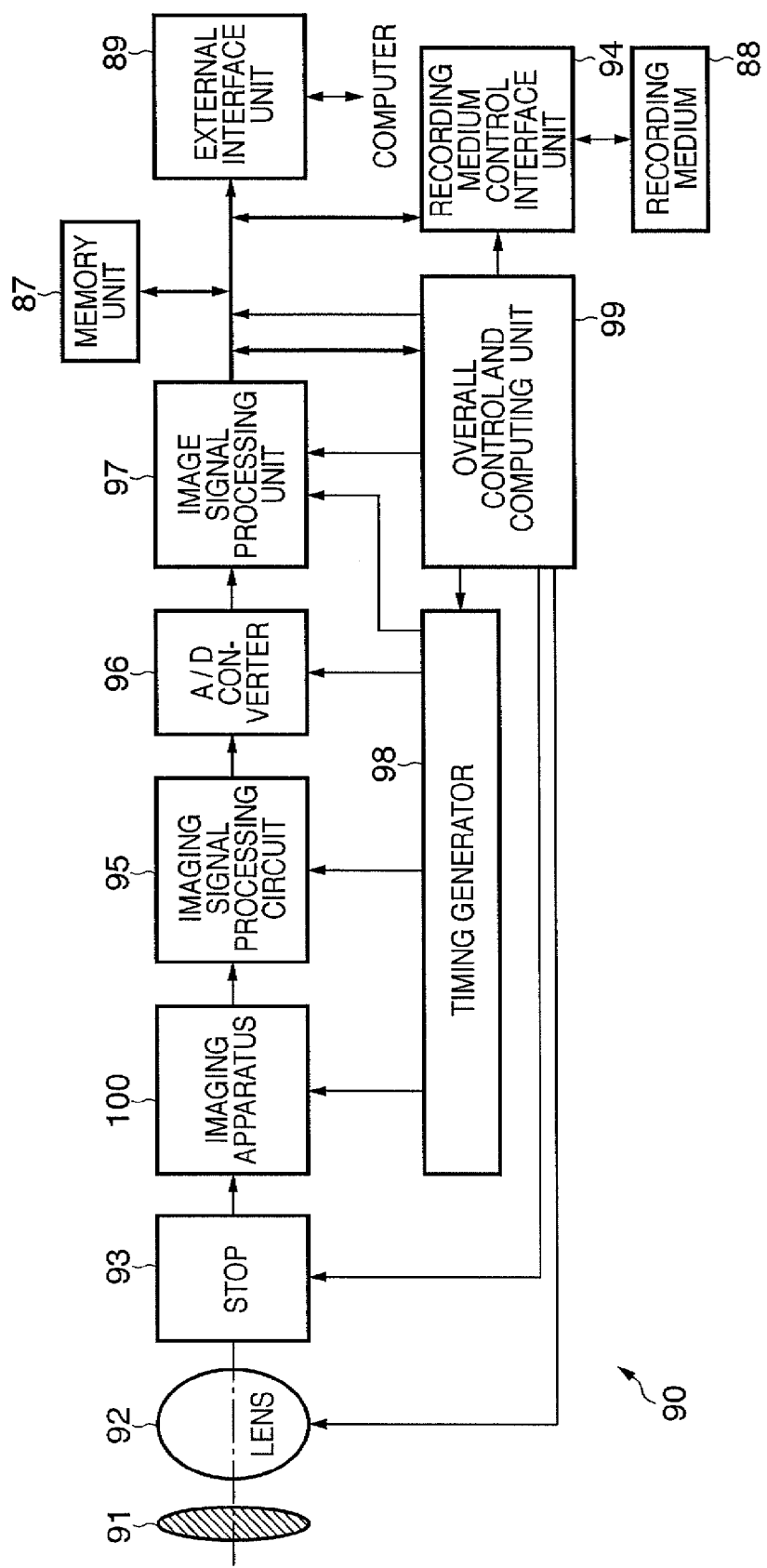
FIG. 5 is a block diagram of an imaging system resulting from application of the imaging apparatus according to the first embodiment.

FIG. 5 shows an example of an imaging system resulting from application of the imaging apparatus 100 according to the present invention.

As shown in FIG. 5, the imaging system 90 mainly includes an optical system, the imaging apparatus 100, and a signal processing unit. The optical system mainly includes a shutter 91, photographing lens 92, and stop 93. The signal processing unit mainly includes a imaging signal processing circuit 95, A/D converter 96, image signal processing unit 97, memory unit 87, external interface unit 89, timing generator 98, overall control and computing unit 99, recording medium 88, and recording medium control interface unit 94. Incidentally, it is not strictly necessary that the signal processing unit should have the recording medium 88.

The shutter 91 is installed in front of the photographing lens 92 on an optical path and controls exposure.

The photographing lens 92 refracts incident light and forms an image on the imaging apparatus 100.

The stop 93 is installed between the photographing lens 92 and imaging apparatus 100 on the optical path and controls quantity of light admitted into the imaging apparatus 100 after passing through the photographing lens 92.

The imaging apparatus 100 converts the subject image formed on the pixel array PA into an image signal. Next, the imaging apparatus 100 reads out and outputs the image signal from the pixel array PA.

The imaging signal processing circuit 95 is connected to the imaging apparatus 100 and processes the image signal output from the imaging apparatus 100.

The A/D converter 96 is connected to the imaging signal processing circuit 95 and converts the processed image signal (analog signal) output from the imaging signal processing circuit 95 into a digital signal.

The image signal processing unit 97 is connected to the A/D converter 96 and generates image data by performing correction or other computational processes on the image signal (digital signal) output from the A/D converter 96. The image data is supplied to memory unit 87, external interface unit 89, overall control and computing unit 99, recording medium control interface unit 94, and the like.

The memory unit 87 is connected to the image signal processing unit 97 and stores the image data output from the image signal processing unit 97.

The external interface unit 89 is connected to the image signal processing unit 97. Consequently, the image data output from the image signal processing unit 97 can be transferred to external devices (such as a personal computer) via the external interface unit 89.

The timing generator 98 is connected to the imaging apparatus 100, imaging signal processing circuit 95, A/D converter 96, and image signal processing unit 97. Consequently, a timing signal is supplied to the imaging apparatus 100, imaging signal processing circuit 95, A/D converter 96, and image signal processing unit 97, all of which then operate in synch with the timing signal.

The overall control and computing unit 99 is connected to the timing generator 98, image signal processing unit 97, and recording medium control interface unit 94 and controls the timing generator 98, image signal processing unit 97, and recording medium control interface unit 94 collectively.

The recording medium 88 is removably connected to the recording medium control interface unit 94. The image data output from the image signal processing unit 97 is recorded on the recording medium 88 via the recording medium control interface unit 94.

The above configuration provides a good image (image data) if a good image signal is obtained by the imaging apparatus 100.

Figure 6:
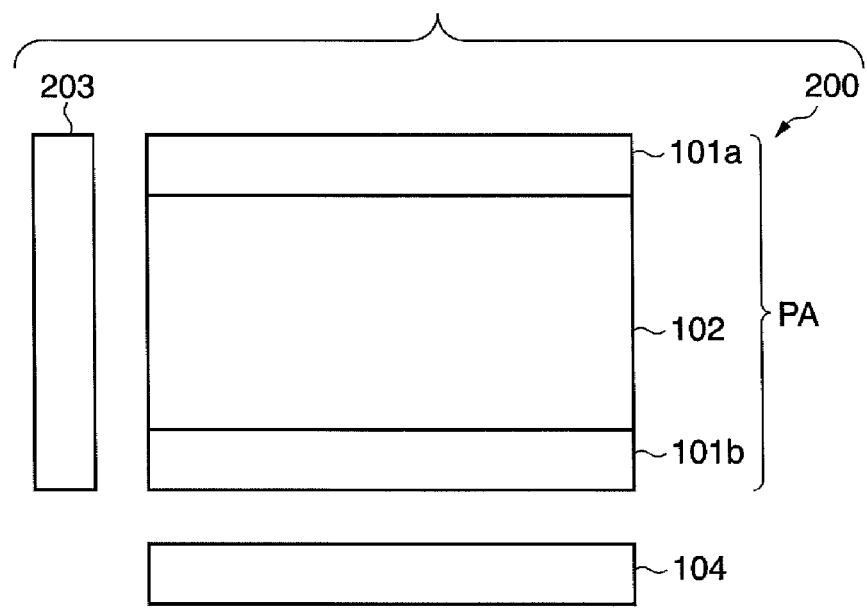
FIG. 6 is a diagram of an imaging apparatus according to a second embodiment of the present invention.
Figure 7:
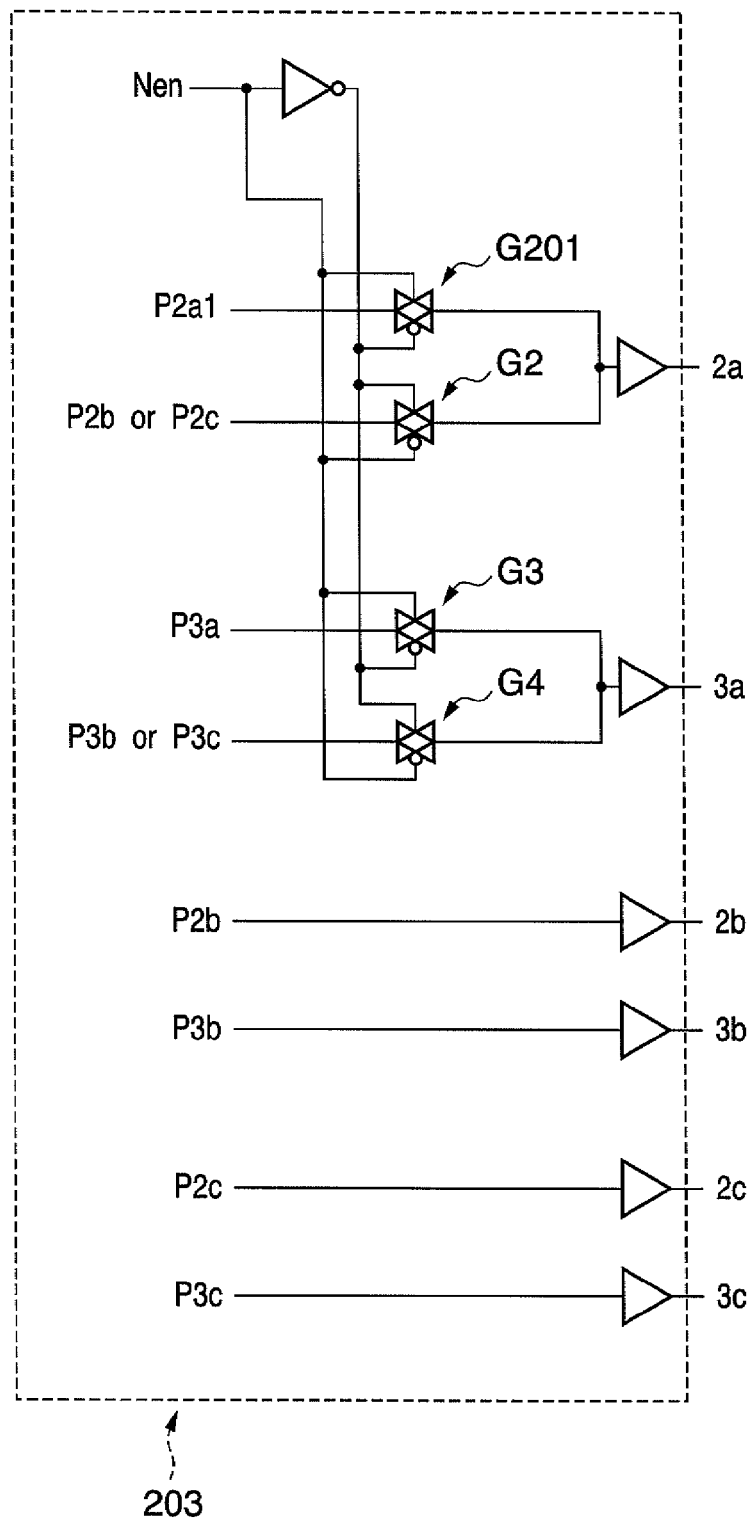
FIG. 7 is a diagram showing a configuration of a pixel array in the imaging apparatus.
Figure 8:
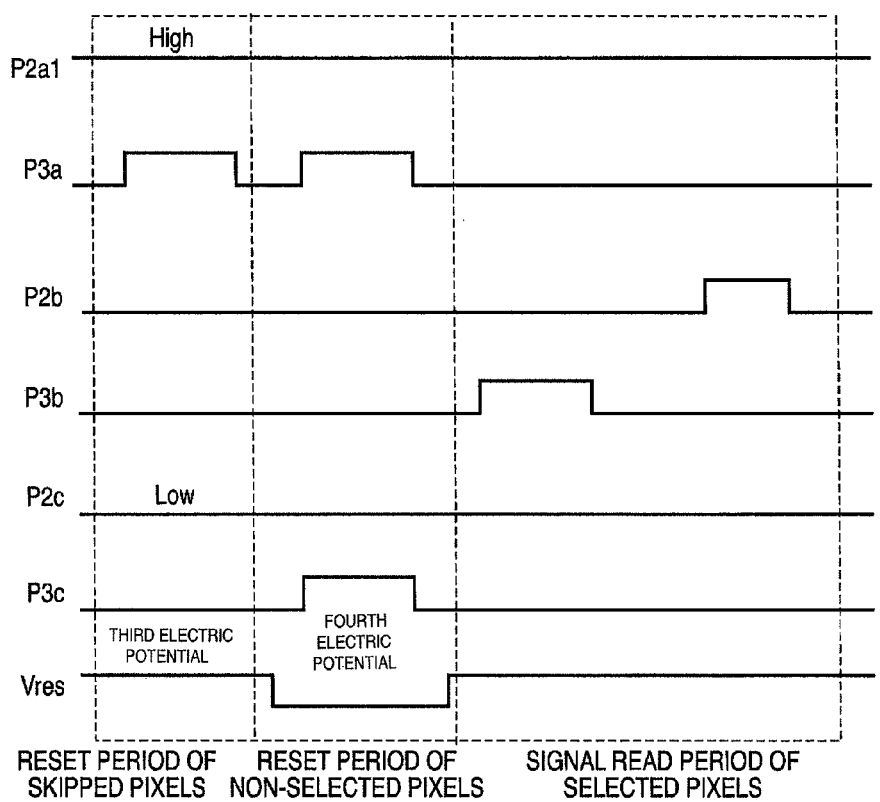
FIG. 8 is a waveform chart of pulses supplied by a driving unit to pixels.

Next, an imaging apparatus 200 according to a second embodiment of the present invention will be described with reference to FIGS. 6 to 8. FIG. 6 is a diagram of the imaging apparatus 200 according to the second embodiment of the present invention. FIG. 7 is a diagram showing a configuration of a pixel array PA in the imaging apparatus 200. FIG. 8 is a waveform chart of pulses supplied by a driving unit 203 to pixels. The following description will focus on differences from the first embodiment, wherein the same components as those in the first embodiment will be denoted by the same reference numerals as the corresponding components in the first embodiment, and a description thereof will be omitted.

The imaging apparatus 200 is similar to the first embodiment in its basic configuration, but differs from the first embodiment in that it has a driving unit 203.

As shown in FIG. 7, the driving unit 203 differs from the driving unit 103 according to the first embodiment in that it has a transfer gate G201. Consequently, operation of the driving unit 203 upon selection of the first mode differs as follows.

Specifically, a High signal is input in the mode control terminal Nen shown in FIG. 7, indicating that the first mode has been selected. Consequently, the transfer gates G201 and G3 are opened while the transfer gates G2 and G4 are closed. In the first mode, the driving unit 203 supplies pulses P2a1 (see FIG. 8) to the transfer units 2a of the pixels in the non-readout regions 102a and 102b, and pulses P3a (see FIG. 8) to the setting units 3a.

That is, in the first mode, the driving unit 203 drives each of the pixels in the non-readout regions 102a and 102b such that the transfer unit 2a is maintained in an ON state in the first, second, and third periods. In other words, in the setting process and deselection process, each of the pixels in the non-readout regions 102a and 102b are driven such that the transfer unit 2a is maintained in an ON state.

According to the first embodiment, in each of the pixels in the non-readout regions 102a and 102b, both the transfer unit 2a and setting unit 3a are pulse-driven in the first mode. Since the input unit 5 is connected to the transfer unit 2a and setting unit 3a, when the two elements are pulse-driven, the electric potential of the input unit 5 fluctuates. When the electric potential of the input unit 5 fluctuates, the signal output fluctuates as well via the amplification unit 4.

If, for example, amounts of fluctuation in the input unit 5 differ greatly between a central portion and peripheral portion of the pixel array PA, in-plane shading of the output signal occurs. Besides, when the transfer unit 2a and setting unit 3a are pulse-driven, the reference voltage of the photoelectric conversion unit 1 fluctuates via a semiconductor substrate, causing photoelectric charge accumulated in the photoelectric conversion unit 1 to leak out. Particularly if photoelectric charge has been accumulated in the photoelectric conversion unit 1 almost to saturation, since electric charge is already ready to leak out into adjacent pixels, slight fluctuations in the reference voltage will cause the photoelectric charge to leak out into the adjacent pixels.

In contrast, according to the second embodiment, in each of the pixels in the non-readout regions 102a and 102b, only the setting unit 3a is pulse-driven while the transfer unit 2a is maintained in the ON state. That is, fewer elements (e.g., transistors) are pulse-driven in the second embodiment than in the first embodiment. This makes it possible to reduce in-plane shading of the output signal and leakage of the photoelectric charge accumulated in the photoelectric conversion unit 1 into adjacent pixels.

Figure 9:
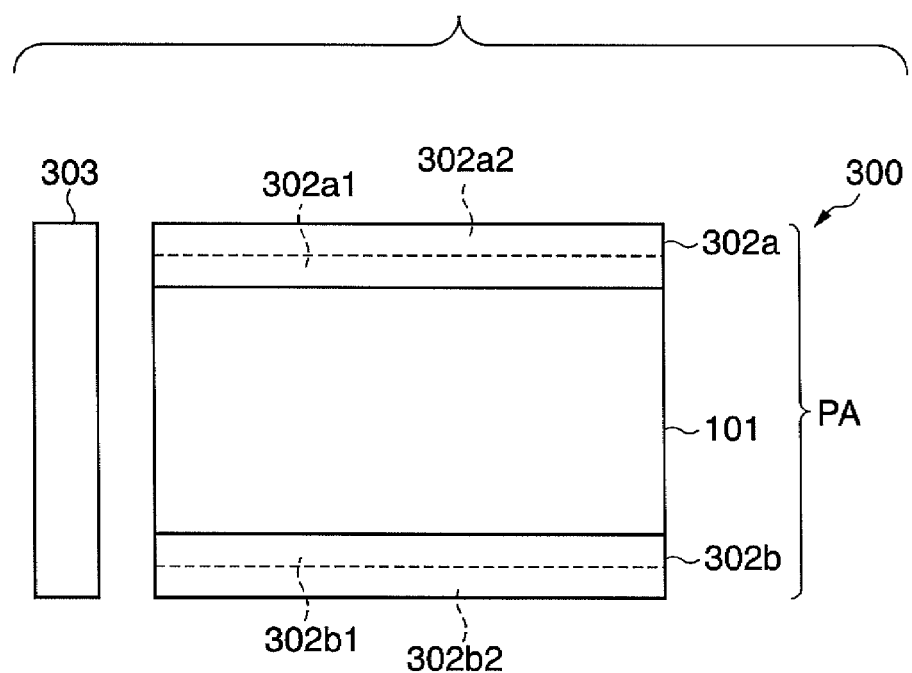
FIG. 9 is a diagram of an imaging apparatus according to a third embodiment of the present invention.
Figure 10:
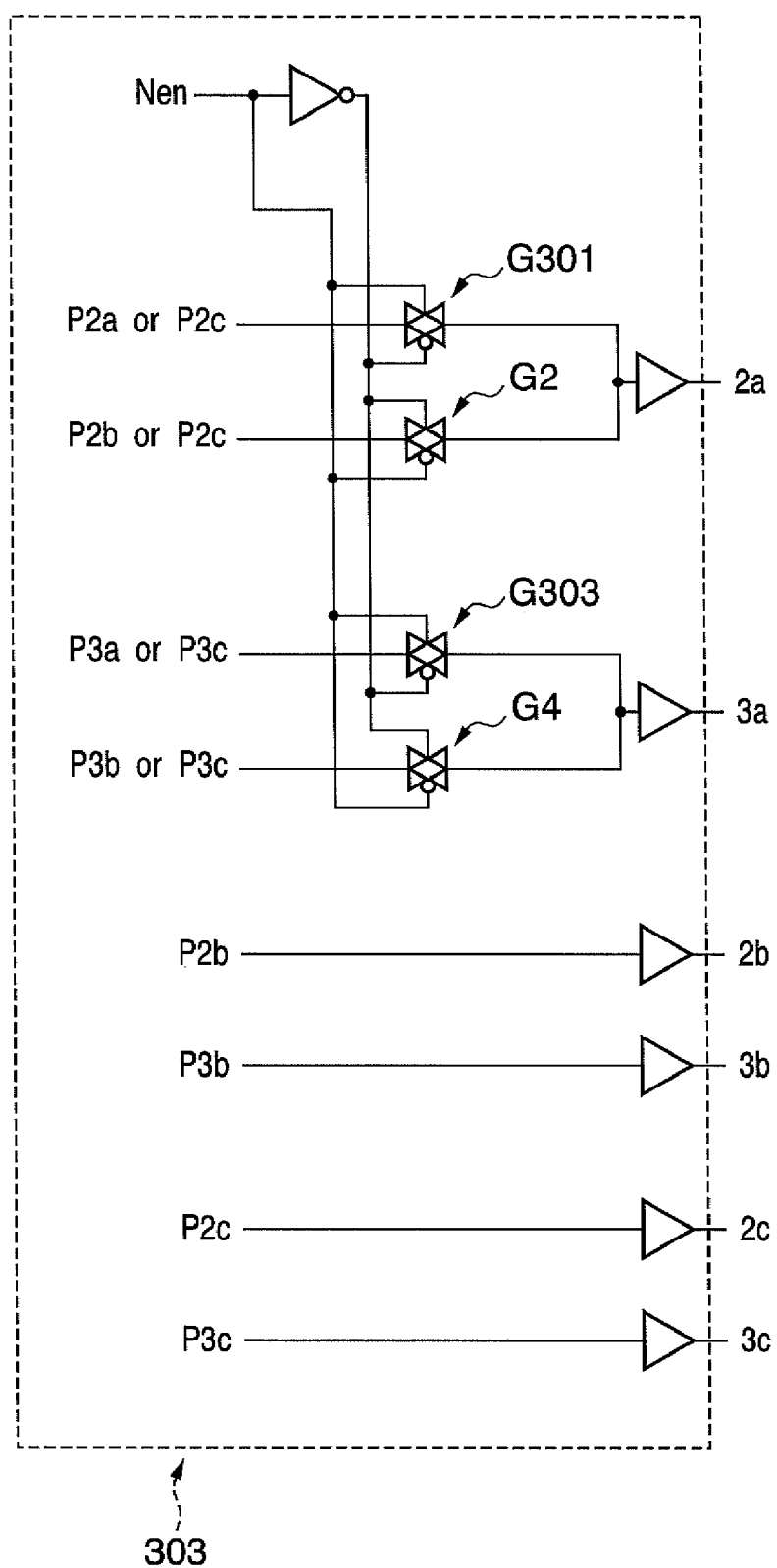
FIG. 10 is a diagram showing part of a circuit configuration in a driving unit.

Next, an imaging apparatus 300 according to a third embodiment of the present invention will be described with reference to FIGS. 9 and 10. FIG. 9 is a diagram of the imaging apparatus 300 according to the third embodiment of the present invention. FIG. 10 is a diagram showing a configuration of a driving unit 203 in the imaging apparatus 300. The following description will focus on differences from the first embodiment, wherein the same components as those in the first embodiment will be denoted by the same reference numerals as the corresponding components in the first embodiment, and description thereof will be omitted.

The imaging apparatus 300 is similar to the first embodiment in its basic configuration, but a driving unit 303 differs from the driving unit 103 according to the first embodiment in that it has transfer gates G301 and G303 as shown in FIG. 10. Consequently, operation of the driving unit 303 upon selection of the first mode differs as follows.

A High signal is input in the mode control terminal Nen shown in FIG. 10, indicating that the first mode has been selected. Consequently, the transfer gates G301 and G303 are opened while the transfer gates G2 and G4 are closed. In the first mode, the driving unit 303 supplies pulses P2a and P3a to the pixels in the portions 302a1 and 302b1 of the non-readout regions 302a and 302b which are adjacent to the readout region 101 as shown in FIG. 9. That is, the driving unit 303 drives each of the pixels in the portions 302a1 and 302b1 in the non-readout regions 302a and 302b such that the setting unit 3a sets the input unit 5 to the third electric potential with the transfer unit 2a being ready to transfer electric charge in the first period.

As described above, according to the first embodiment, in the first mode, both the transfer units 2a and setting units 3a of all the pixels in the non-readout regions 102a and 102b are pulse-driven in the first period.

In contrast, according to the third embodiment, in the first mode, both the transfer units 2a and setting units 3a of the pixels in the portions 302a1 and 302b1 of the non-readout regions 302a and 302b which are adjacent to the readout region 101 are pulse-driven in the first period. In the other portions 302a2 and 302b2 of the non-readout regions 302a and 302b, both the transfer units 2a and setting units 3a of the pixels remain off in the first period. That is, fewer elements (e.g., transistors) are pulse-driven in the first period according to the third embodiment than in the first embodiment. This makes it possible to reduce in-plane shading of the output signal.

Incidentally, the driving unit 303 (e.g., a vertical shift register) may sequentially scan the pixels (pixels to which P2a and P3a are supplied) in the portions 302a1 and 302b1 of the non-readout regions 302a and 302b which are adjacent to the readout region 101. This makes it possible to reset the photoelectric charge of all the pixels in the portions 302a1 and 302b1 of the non-readout regions 302a and 302b which are adjacent to the readout region 101.

However, there is no need for the driving unit 303 to reset the photoelectric charge of all the pixels in the portions 302a1 and 302b1 of the non-readout regions 302a and 302b which are adjacent to the readout region 101. That is, the driving unit 303 may supply P2a and P3a to only part of the pixels in the portions 302a1 and 302b1 of the non-readout regions 302a and 302b which are located near the readout region 101. This also can prevent photoelectric charge from overflowing (leaking) from the pixels in the non-readout region into the pixels in the readout region.

While the present invention has been described with reference to exemplary embodiments, it is to be understood that the invention is not limited to the disclosed exemplary embodiments. The scope of the following claims is to be accorded the broadest interpretation such that encompass all such modifications and equivalent structures and functions.

This application claims the benefit of Japanese Patent Application Nos. 2007-050223 filed on Feb. 28, 2007 and 2007-325213 filed on Dec. 17, 2007, which are hereby incorporated by reference herein in their entirety.

What is claimed is:
1. An imaging apparatus comprising:
a pixel array in which a plurality of pixels are arranged in a row direction and in a column direction, each of the pixels including a photoelectric conversion unit, an amplification unit which amplifies a signal based on electric charge generated in the photoelectric conversion unit, an input unit of the amplification unit, a transfer unit which transfers the electric charge accumulated in the photoelectric conversion unit to the input unit, and a setting unit which sets the input unit to a first electric potential for the pixel to be selected or sets the input unit to a second electric potential for the pixel to be deselected; and a driving unit which drives the plurality of pixels in the pixel array, wherein, in a first mode, the pixel array includes a readout region in which signals are read out from the pixels and a non-readout region in which no signal is read out from the pixels, the driving unit drives each of the pixels in the non-readout region in the first mode such that the setting unit sets the input unit to a third electric potential with the transfer unit being ready to transfer the electric charge to reset the photoelectric conversion unit in a first period and that the setting unit sets the input unit to a fourth electric potential for the pixel to be deselected in a second period later than the first period, the transfer unit in each of the plurality of pixels includes a transistor, and the driving unit drives each of the pixels in the non-readout region in the first mode such that the transfer unit is maintained in an ON state.

2. The imaging apparatus according to claim 1, wherein the amplification unit in each of the plurality of pixels includes a transistor;

the amplification unit turns on at the first electric potential and the third electric potential; and the amplification unit turns off at the second electric potential and the fourth electric potential.

3. The imaging apparatus according to claim 1, wherein the third electric potential is equal to the first electric potential; and the fourth electric potential is equal to the second electric potential.

4. The imaging apparatus according to claim 1, wherein signals are read out from all the pixels in the pixel array in a second mode.

5. An imaging apparatus comprising:

pixel array in which a plurality of pixels are arranged in a row direction and in a column direction, each of the pixels including a photoelectric conversion unit, an amplification unit which amplifies a signal based on electric charge generated in the photoelectric conversion unit, an input unit of the amplification unit, a transfer unit which transfers the electric charge accumulated in the photoelectric conversion unit to the input unit, and a setting unit which sets the input unit to a first electric potential for the pixel to be selected or sets the input unit to a second electric potential for the pixel to be deselected; and a driving unit which drives the plurality of pixels in the pixel array, wherein, in a first mode, the pixel array includes a readout region in which signals are read out from the pixels and a non-readout region in which no signal is read out from the pixels, and the driving unit drives pixels in a portion of the non-readout region which is adjacent to the readout region in the first mode such that the setting unit sets the input unit to a third electric potential with the transfer unit being ready to transfer the electric charge to reset the photoelectric conversion unit in a first period and that the setting unit sets the input unit to a fourth electric potential for the pixel to be deselected in a second period later than the first period, the transfer unit in each of the plurality of pixels includes a transistor; and the driving unit drives each of the pixels in the portion of the non-readout region which is adjacent to the readout region in the first mode such that the transfer unit is maintained in an ON state.

6. The imaging apparatus according to claim 5, wherein the amplification unit in each of the plurality of pixels includes a transistor;

the amplification unit turns on at the first electric potential and the third electric potential; and the amplification unit turns off at the second electric potential and the fourth electric potential.

7. The imaging apparatus according to claim 5, wherein the third electric potential is equal to the first electric potential; and the fourth electric potential is equal to the second electric potential.

8. The imaging apparatus according to claim 5, wherein signals are read out from all the pixels in the pixel array in a second mode.

9. A driving method for an imaging apparatus which comprises a pixel array in which a plurality of pixels are arranged in a row direction and in a column direction, each of the pixels including a photoelectric conversion unit, an amplification unit which amplifies a signal based on electric charge generated in the photoelectric conversion unit, an input unit of the amplification unit, a transfer unit which transfers the electric charge accumulated in the photoelectric conversion unit to the input unit, and a setting unit which sets the input unit to a first electric potential for the pixel to be selected or sets the input unit to a second electric potential for the pixel to be deselected, wherein, in a first mode, the pixel array includes a readout region in which signals are read out from the pixels and a non-readout region in which no signal is read out from the pixels, the driving method comprising:

a setting step of driving each of the pixels in the non-readout region in the first mode such that the setting unit sets the input unit to a third electric potential with the transfer unit being ready to transfer the electric charge in a first period, and a deselection step of driving each of the pixels in the non-readout region in the first mode such that the setting unit sets the input unit to a fourth electric potential for the pixel to be deselected in a second period later than the first period, wherein the transfer unit in each of the plurality of pixels includes a transistor, and the setting step and the deselection step drive each of the pixels in the non-readout region in the first mode such that the transfer unit is maintained in an ON state.

10. The driving method for an imaging apparatus according to claim 9, wherein the amplification unit in each of the plurality of pixels includes a transistor;

the amplification unit turns on at the first electric potential and the third electric potential; and the amplification unit turns off at the second electric potential and the fourth electric potential.

11. The driving method for an imaging apparatus according to claim 9, wherein:

the third electric potential is equal to the first electric potential; and the fourth electric potential is equal to the second electric potential.

12. The driving method for an imaging apparatus according to claim 9, wherein signals resulting from the electric charge held in the input unit of all the pixels in the pixel array are read out in a second mode.

13. A driving method for an imaging apparatus which comprises a pixel array in which a plurality of pixels are arranged in a row direction and in a column direction, each of the pixels including a photoelectric conversion unit, an amplification unit which amplifies a signal based on electric charge generated in the photoelectric conversion unit, an input unit of the amplification unit, a transfer unit which transfers the electric charge accumulated in the photoelectric conversion unit to the input unit, and a setting unit which sets the input unit to a first electric potential for the pixel to be selected or sets the input unit to a second electric potential for the pixel to be deselected, wherein, in a first mode, the pixel array includes a readout region in which signals are read out from the pixels and a non-readout region in which no signal is read out from the pixels, the driving method comprising:

a setting step of driving pixels in a portion of the non-readout region which is adjacent to the readout region in the first mode such that the setting unit sets the input unit to a third electric potential with the transfer unit being ready to transfer the electric charge in a first period, and a deselection step of driving each of the pixels in the non-readout region in the first mode such that the setting unit sets the input unit to a fourth electric potential for the pixel to be deselected in a second period later than the first period, wherein the transfer unit in each of the plurality of pixels includes a transistor; and the setting step and the deselection step drive each of the pixels in the portion of the non-readout region which is adjacent to the readout region in the first mode such that the transfer unit is maintained in an ON state.

14. The driving method for an imaging apparatus according to claim 13, wherein the amplification unit in each of the plurality of pixels includes a transistor;

the amplification unit turns on at the first electric potential and the third electric potential; and the amplification unit turns off at the second electric potential and the fourth electric potential.

15. The driving method for an imaging apparatus according to claim 13, wherein the third electric potential is equal to the first electric potential; and the fourth electric potential is equal to the second electric potential.

16. The driving method for an imaging apparatus according to claim 13, wherein signals resulting from the electric charge held in the input unit of all the pixels in the pixel array are read out in a second mode.

17. An imaging system comprising:

the imaging apparatus according to claim 1;

an optical system which focuses light onto the pixel array of the imaging apparatus; and a signal processing unit which processes an output signal from the imaging apparatus and thereby generates image data.

* * * * *